United States Patent [19]

Motosugi et al.

[11] 4,237,826
[45] Dec. 9, 1980

[54] MULTI-CYLINDER INTERNAL COMBUSTION ENGINE EQUIPPED WITH AN ACCUMULATION CHAMBER

[75] Inventors: Katsuhiko Motosugi; Setsuro Sekiya, both of Toyota; Hidetaka Nohira, Mishima; Sumio Ito, Susono; Hisashi Ohki, Numazu; Teruo Kumai, Susono, all of Japan

[73] Assignee: Toyota Jidosha Kogyo Kabushiki Kaisha, Toyota, Japan

[21] Appl. No.: 897

[22] Filed: Jan. 4, 1979

[30] Foreign Application Priority Data

Mar. 2, 1978 [JP] Japan .................. 53-22819

[51] Int. Cl.³ .................. F02B 19/00; F02B 21/00
[52] U.S. Cl. .................. 123/25 R; 123/262/287; 123/292/568; 123/26
[58] Field of Search .................. 123/75 E, 105, 32 ST, 123/32 SP, 33 C, 33 E, 33 UC, 26, 75 B, 25 R, 25 A, 119 A, 119 C

[56] References Cited

U.S. PATENT DOCUMENTS

| | | | |
|---|---|---|---|
| 1,384,133 | 7/1921 | Howe | 123/105 |
| 1,467,998 | 9/1923 | Brown | 123/75 E |
| 1,788,076 | 1/1931 | Laikowsky | 123/75 E |
| 1,869,455 | 8/1932 | Laikowsky | 123/75 E |
| 2,796,054 | 6/1957 | Miller | 123/75 E |
| 3,714,932 | 2/1973 | Meacham et al. | 123/75 E |
| 3,919,986 | 11/1975 | Goto | 123/105 |
| 4,084,556 | 4/1978 | Villella | 123/75 E |
| 4,128,085 | 12/1978 | Kunii | 123/75 E |

Primary Examiner—Ira S. Lazarus
Attorney, Agent, or Firm—Kenyon & Kenyon

[57] ABSTRACT

A multi-cylinder internal combustion engine having a plurality of cylinders, each comprising a combustion chamber and an accumulation chamber which are interconnected to each other via an accumulation valve. The accumulation chambers are interconnected to each other via a common connecting passage. The opening operation of the accumulation valve is controlled so that the accumulation valve remains opened during the compression stroke. In the first half of the compression stroke, a jet of the combustible mixture is spouted out into the combustion chamber from the accumulation chamber to create a strong swirl motion in the combustion chamber. In the latter half of the compression stroke, the combustible mixture in the combustion chamber flows into the accumulation chamber to accumulate the combustible mixture under high pressure, which is spouted out into the combustion chamber at the next cycle.

13 Claims, 12 Drawing Figures

MULTI-CYLINDER INTERNAL COMBUSTION ENGINE EQUIPPED WITH AN ACCUMULATION CHAMBER

DESCRIPTION OF THE INVENTION

The present invention relates to an internal combustion engine equipped with an accumulation chamber.

At present, in internal combustion engines, it is an important problem to improve the thermal efficiency while reducing the amount of harmful components in exhaust gas. As a method of effectively reducing the amount of harmful components in exhaust gas, there has been known a method of simultaneously reducing the amount of harmful unburned hydrocarbon (HC), carbon monoxide (CO) oxides of nitrogen ($NO_x$) in the exhaust gas by using a lean air-fuel mixture, and; there has also been known a method of reducing the amount of harmful $NO_x$ components in the exhaust gas by recirculating the exhaust gas into the intake system of an engine. However, in either case wherein a lean air-fuel mixture or a mixture containing the recirculated exhaust gas therein is used, there occurs a common problem in that, since the flame speed of such a mixture is very low and, thus, the burning velocity is low, a high thermal efficiency cannot be obtained and, as a result, a satisfactory high output of an engine cannot be obtained. Consequently, in the case wherein a lean air-fuel mixture or a mixture containing the recirculated exhaust gas therein is used, the most important problem feed in improving thermal efficiency, is to increase the flame speed.

With regard to an engine capable of increasing the burning velocity of the combustible mixture in the combustion chamber, the present applicant has already proposed an engine equipped with an accumulation chamber which is connected to the combustion chamber via an accumulation valve, so that a part of the suction gas introduced into the combustion chamber from the intake system of the engine is temporarily accumulated in the accumulation chamber. In this engine, the accumulation valve is opened from the beginning of the compression stroke to the end thereof, so that the suction gas accumulated in the accumulation chamber under high pressure is spouted from the accumulation chamber into the combustion chamber in the first half of the compression stroke. The suction gas thus spouted causes a strong swirl turbulence in the combustion chamber and, as a result, the burning velocity is increased. However, in this engine, since an accumulation chamber is provided independently for each cylinder, there occurs the following problems.

(1) It is impossible to use a large space for the accumulation chamber within the limited space of an engine.

(2) Since the suction gas is accumulated in the accumulation chamber for a relatively long time, the temperature of the suction gas is reduced during this time and, as a result, the pressure in the accumulation chamber is also reduced.

(3) Since the same amount of the suction gas is not accumulated in the accumulation chamber of every cylinder, there is a tendency for torque fluctuation to occur.

(4) When an engine is operating under a partial load, the compression pressure in the combustion chamber is not increased to a great extent. Consequently, the pressure in the accumulation chamber is also not increased to a great extent. As a result of this, when an engine is operating under a partial load, since the energy of the suction gas spouted from the accumulation chamber is not very large, it is difficult to cause a strong turbulence in the combustion chamber.

An object of the present invention is to provide an improvement of the above-mentioned engine, in which the above-mentioned problems are eliminated by interconnecting the accumulation chambers provided for each cylinder.

Another object of the present invention is to provide an internal combustion engine capable of increasing the energy of the suction gas spouted from the accumulation chamber in such a way that the pressure of the suction gas in the accumulation chamber is increased by feeding a gas under pressure into the accumulation chamber.

According to the present invention, there is provided a multi-cylinder internal combustion engine having a cylinder block, a cylinder head and a plurality of cylinders, each comprising a cylinder bore formed in said cylinder block, a piston movable in said cylinder bore, a combustion chamber formed between said piston and said cylinder head, an accumulation chamber formed in said cylinder head and having a port connected to said combustion chamber, an intake passage with an intake valve for leading a suction gas into said combustion chamber, an exhaust passage with an exhaust valve for discharging exhaust gas into the atmosphere, and valve means for opening said port of said accumulation chamber during the compression stroke to spout a jet of the suction gas under pressure into said combustion chamber from said accumulation chamber during the first half of the compression stroke and permit the inflow of the suction gas into said accumulation chamber from said combustion chamber during the latter half of the compression stroke, for temporarily accumulating the suction gas under pressure after said valve means closes said port of said accumulation chamber, said engine further comprising at least one connecting passage interconnecting at least two accumulation chambers to each other.

The present invention may be more fully understood from the following description of preferred embodiments of the invention, together with the accompanying drawings.

DESCRIPTION OF PREFERRED EMBODIMENTS

Figure 1:
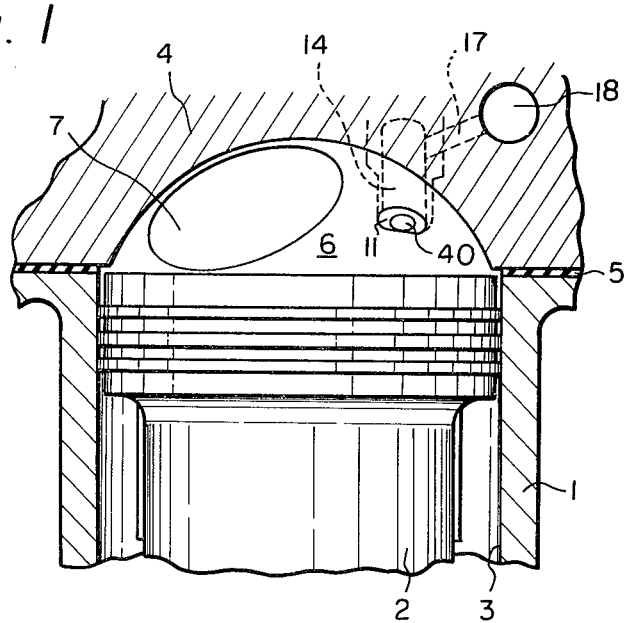
FIG. 1 is a cross-sectional side view of an embodiment of an internal combustion engine according to the present invention.
Figure 2:
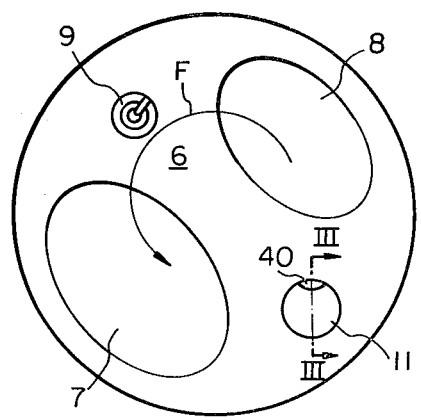
FIG. 2 is a bottom view of a part of the cylinder head shown in FIG. 1.
Figure 3:
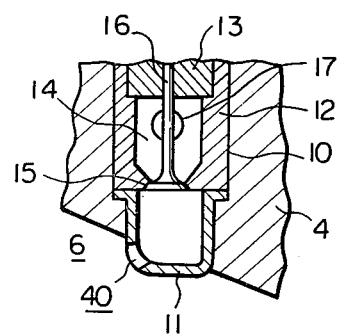
FIG. 3 is a cross-sectional view taken along the line III—III of FIG. 2.

Referring to FIGS. 1 through 3, 1 designates a cylinder block, 2 a piston movable in a cylinder bore 3 formed in the cylinder block 1, 4 a cylinder head fixed onto the cylinder block 1 via a gasket and 6 a combustion chamber formed between the piston 2 and the cylinder head 4; 7 designates an intake valve, 8 an exhaust valve, and 9 a spark plug. As illustrated in FIG. 3, a stepped hole 10 is formed in the cylinder head 4, and a hollow cup 11 is fitted into the stepped hole 10. This hollow cup 11 is secured onto the cylinder head 4 by a hollow fixing member 12 which is fitted into the stepped hole 10. In addition, a valve support member 13 is fixed onto the upper end of the hollow fixing member 12, so that an accumulation chamber 14 is formed in the hollow fixing member 12. A valve seat 15 is formed in the lower end of the hollow fixing member 12 and an accumulation valve 16, cooperating with the valve seat 15, is slidably mounted on the valve support member 13. The accumulation valve 16 is actuated by means of a valve drive mechanism (not shown) and the accumulation chamber 14 is connected to the inside of the hollow cup 11 when the accumulation valve 16 opens. As is illustrated in FIGS. 1 through 3, the lower portion of the hollow cup 11 is exposed to the combustion chamber 6, and an opening 40 is formed on the circumferential wall of the lower portion of the hollow cup 11. As is illustrated in FIG. 2, this opening 40 is directed in the circumferential direction of the combustion chamber 6.

Figure 4:
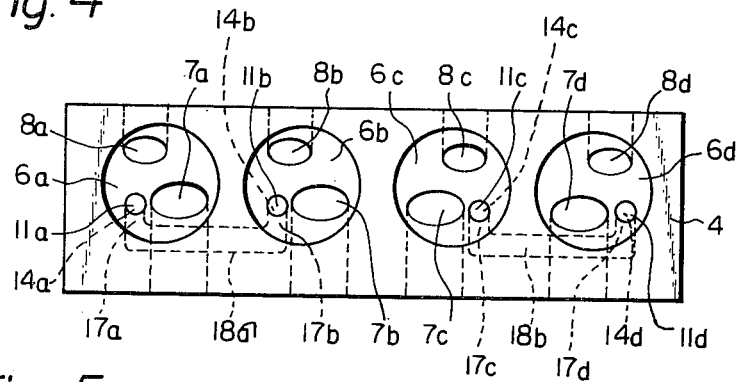
FIG. 4 is a bottom view of the cylinder head shown in FIG. 1.

FIG. 4 is a bottom view of the cylinder head 4 of a four-cylinder engine, one cylinder of which is illustrated in FIG. 1. In FIG. 4, similar components to those indicated in FIGS. 1 and 2 are indicated with the same reference numerals with suffix letter a, b, c and d. Referring to FIG. 4, a pair of the accumulation chambers 14 are interconnected to each other via the corresponding branch 17 and a common connecting passage 18. That is, as is illustrated in FIG. 4, the accumulation chambers 14a, 14b of the cylinders adjacent to each other are interconnected to each other via the branches 17a, 17b and the common connecting passage 18a, while the accumulation chambers 14c, 14d of the cylinders adjacent to each other are interconnected to each other via the branches 17c, 17d and a common connecting passage 18b.

Figure 6:
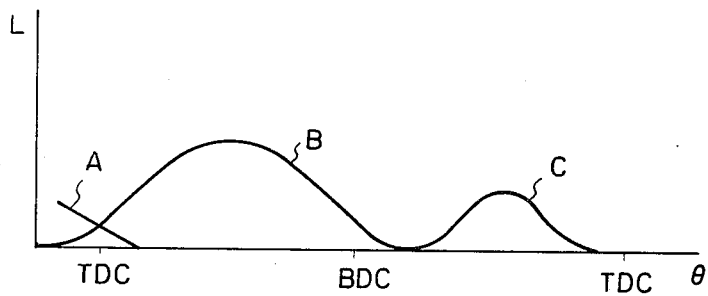
FIG. 6 is a graph showing an opening time of the accumulation valve.
Figure 6A:
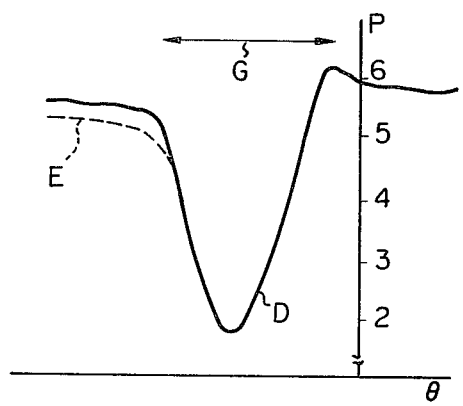
FIG. 6a is a graph showing changes in pressure in the accumulation chamber.

FIG. 6 is a graph showing an opening timing of the accumulation valve. In FIG. 6, the ordinate indicates valve lift L, and the abscissa indicates crank angle $\theta$. In addition, in FIG. 6, the curved lines A, B and C indicate the valve lifts of the exhaust valve, the intake valve and the accumulation valve. FIG. 6a shows changes in pressure in the accumulation chamber. In FIG. 6a, the ordinate indicates pressure P (kg/cm$^2$), and the abscissa indicates crank angle $\theta$. From FIG. 6, it will be understood that the accumulation valve is opened at the beginning of the compression stroke and closed at the end of the compression stroke. In the embodiment shown in FIGS. 1 through 4, it is preferable that the closing timing of the accumulation valve 16 be set at a timing near the ignition timing.

In operation, at the time of the intake stroke, a lean air-fuel mixture or a mixture containing a large amount of recirculated exhaust gas therein is introduced into the combustion chamber 6 via the intake valve 7. After this, when the intake valve 7 is closed and the piston 2 starts the compressing action of the combustible mixture in the combustion chamber 6, the accumulation valve 16 is opened. As is hereinafter described, a combustible mixture under high pressure, which is introduced into the accumulation chamber 14 during the compression stroke in the preceding cycle, is accumulated in the accumulation chamber 14, and on the other hand, the pressure in the combustion chamber 6 at the start of the compression stroke is lower than the atmospheric pressure. Consequently, the difference between the pressure in the combustion chamber 6 and the pressure in the accumulation chamber 14 is large and, thus, when the accumulation valve 16 is opened, the combustible mixture accumulated in the accumulation chamber 14 is spouted into the combustion chamber 6 via the opening 40 at a high speed. As mentioned previously, the opening 40 formed on the lower portion of the hollow cup 11 is directed in the circumferential direction of the combustion chamber 6. Consequently, when the combustible mixture is spouted from the opening 40, a strong swirl motion shown by the arrow F in FIG. 2 is created in the combustion chamber 6. Then, if the piston 2 further moves upwards, since the pressure in the accumulation chamber 14 is maintained higher than that in the combustion chamber 6 for a while, the combustible mixture in the accumulation chamber 14 continues to be spouted into the combustion chamber 6. As a result of this, the swirl motion created in the combustion chamber 6 is further stengthened. When the piston 2 further moves upwards and the pressure in the accumulation chamber 14 becomes equal to that in the combustion chamber 6, the spouting operation of the combustible mixture in the accumulation chamber 14 is stopped. After this, when the piston 2 further moves upwards, since the pressure in the combustion chamber 6 becomes higher than that in the accumulation chamber 14, the combustible mixture in the combustion chamber 6 flows into the accumulation chamber 14 and then into the common connecting passage 18 via the branch 17 (FIG. 1). The accumulation valve 16 remains opened until the piston 2 reaches a position corresponding to a crank angle near the top dead center at which the ignition is carried out. Consequently, when the accumulation valve 16 is closed, the combustible mixture under high pressure is accumulated in the accumulation chamber 14a, 14b, 14c, 14d, the branches 17a, 17b, 17c, 17d and the common connecting passage 18a, 18b (FIG. 4). When the combustible mixture in the combustion chamber 6 is ignited, and thus the combustion is started, since a strong swirl motion is maintained in the combustion chamber 6, the burning velocity is considerably increased.

In FIG. 4, assuming that the cylinder having the combustion chamber 6b is in the intake stroke when the cylinder having the combustion chamber 6a is in the compression stroke, a part of the combustible mixture in the combustion chamber 6a is forced into the common connecting passage 18a in the latter half of the compression stroke, as mentioned previously. After this, when the stroke of the cylinder having the combustion chamber 6a is changed to the power stroke, the stroke of the cylinder having the combustion chamber 6b is changed to the compression stroke. Then, since the accumulation valve 16 of the accumulation chamber 14b is opened, the combustible mixture accumulated in the accumulation chamber 14a, 14b and the common connecting passage 18a is spouted out from the accumulation chamber 14b into the combustion chamber 6b in the first half of the compression stroke. After this, a part of the combustible mixture in the combustion chamber 6b is forced into the accumulation chambers 14a, 14b and the common connecting passage 18a in the latter half of the compression stroke and accumulated in the accumulation chambers 14a, 14b and the common connecting passage 18a. Then, the combustible mixture thus accumulated is spouted into the combustion chamber 6a at the next cycle. By interconnecting the accumulation chambers of the cylinders adjacent to each other by means of the common connecting passage, the combustible mixture forced into the accumulation chamber of one of the cylinders adjacent to each other is spouted into the combustion chamber of the other cylinder. Consequently, even if the air-fuel ratio of the mixture fed via the intake valve 7 into the combustion chamber of one of the cylinders adjacent to each other is different from that of the mixture fed via the intake valve 7 into the combustion chamber of the other cylinder, since the combustible mixtures in the combustion chambers adjacent to each other are mixed with each other, the difference between the air-fuel ratios of the combustible mixtures in the combustion chambers adjacent to each other becomes small. In addition, in the present invention, the length of time during which the combustible mixture is accumulated in the accumulation chamber is shortened as compared with the case wherein an accumulation chamber is provided independently for each cylinder. As a result of this, in the present invention, since the length of time during which the combustible mixture in the accumulation chamber is cooled by the inner wall of the accumulation chamber is shortened, the pressure drop in the accumulation chamber is reduced. In FIG. 6a, the solid curved line D indicates change in pressure in the accumulation chamber in an engine according to the present invention, and the broken curved line E indicates change in pressure in an engine in which the accumulation chamber is provided independently for each cylinder. In addition, in FIG. 6a, the arrow G indicates the range of the crank angle during which the accumulation valve is opened. From FIG. 6a, it will be understood that the pressure drop in an engine according to the present invention is smaller than that in an engine in which an accumulation chamber is provided independently for each cylinder. In addition, since a pair of the accumulation chambers and the common connecting passage are used as an accumulation chamber for each cylinder, the volume of the accumulation chamber is increased as compared with the case wherein a single accumulation chamber is provided for each cylinder. As a result of this, since the energy of the combustible mixture spouted from the accumulation chamber is increased, a strong swirl motion can be created, and thus the burning velocity can be increased.

Figure 5:
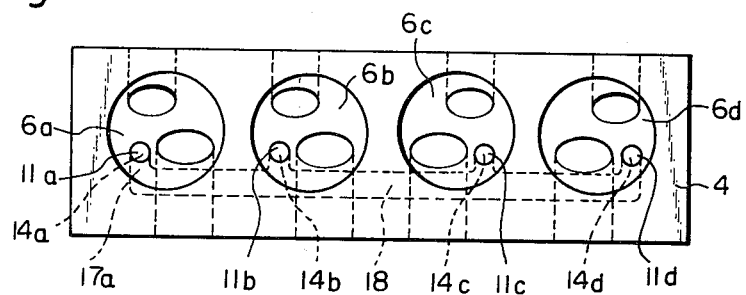
FIG. 5 is a bottom view of the cylinder head of another embodiment according to the present invention.

FIG. 5 illustrates another embodiment. In this embodiment, all of the accumulation chambers 14a, 14b, 14c and 14d are interconnected to each other via a single common connecting passage 18.

Figure 7:
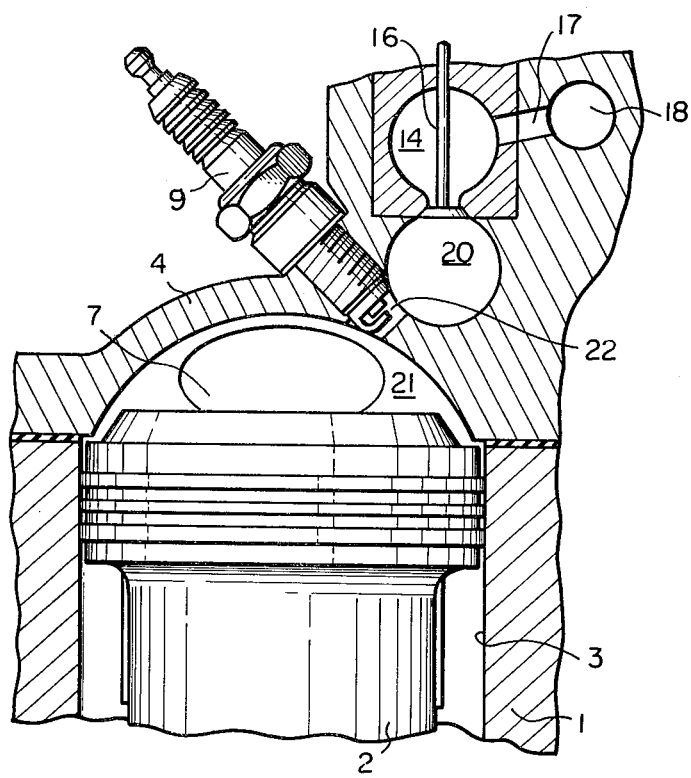
FIG. 7 is a cross-sectional side view of a further embodiment according to the present invention.

FIG. 7 illustrates the case wherein the present invention is applied to an engine equipped with an auxiliary combustion chamber. In this embodiment, a combustion chamber comprises a main combustion chamber 21 and an auxiliary combustion chamber 20 formed in the cylinder head 4. The main combustion chamber 21 and the auxiliary combustion chamber 20 are interconnected to each other via a connecting passage 22 formed in the cylinder head 4, and the electrode of the spark plug 9 is arranged in the connecting passage 22. An accumulation chamber 14 is formed above the auxiliary combustion chamber 20, so that the accumulation chamber 14 and the auxiliary combustion chamber 20 are arranged in tandem. In addition, an accumulation valve 16 is arranged between the accumulation chamber 14 and the auxiliary combustion chamber 20. Furthermore, in the same manner as depicted in FIG. 4, the accumulation chamber 14 is connected to the accumulation chamber of the adjacent cylinder via the branch 17 and the common connecting passage 18.

In the embodiment shown in FIG. 7, when the intake valve 7 is closed, the accumulation valve 16 is opened. At this time, the combustible mixture under high pressure, which is accumulated in the accumulation chamber 14, is spouted into the main combustion chamber 21 via the auxiliary combustion chamber 20 and the connecting passage 22 and, as a result, a strong turbulence is created in the main combustion chamber 21. At this time the inside of the auxiliary combustion chamber 20 and the electrode of the spark plug 9 are scavenged by the combustible mixture spouted from the accumulation chamber 14. After this, when the piston 2 moves upwards, the pressure in the main combustion chamber 21 becomes larger than that in the accumulation chamber 14, and the combustible mixture in the main combustion chamber 21 flows into the accumulation chamber 14 via the connecting passage 22 and the auxiliary combustion chamber 20. When the accumulation valve 16 is closed, the combustible mixture under high pressure is accumulated in the accumulation chamber 14, the branch 17 and the common connecting passage 18. After this, the combustible mixture in the auxiliary combustion chamber 20 is ignited by the spark plug 9, and then the flame of the combustible mixture thus ignited is spouted into the main combustion chamber 21 via the connecting passage 22. As mentioned above, a strong turbulence has been created before the flame is spouted into the main combustion chamber 21. Consequently, when the jet of ignited mixture is spouted from the connecting passage 21, the strong turbulence is further strengthened by the flame. As a result of this, since a strong turbulence is caused in the main combustion chamber 21, the burning velocity is remarkably increased.

Figure 8:
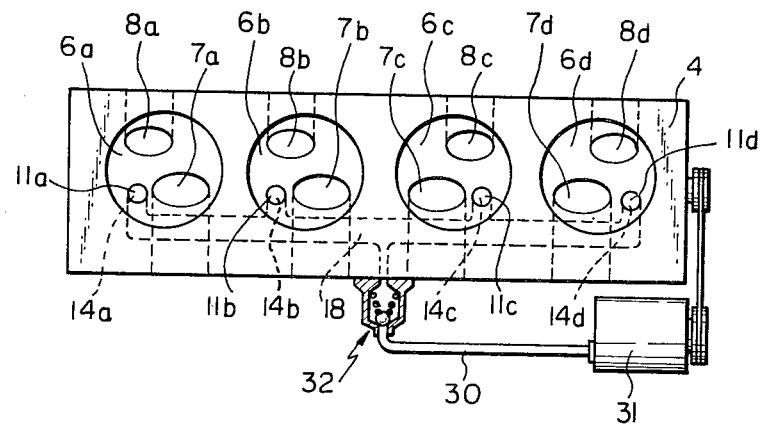
FIG. 8 is a bottom view of the cylinder head of a still further embodiment according to the present invention.

FIG. 8 illustrates a further embodiment. In FIG. 8, each of the cylinders has a construction as illustrated in FIG. 1. Referring to FIG. 8, all of the accumulation chambers 14a, 14b, 14c, 14d are connected to the single common connecting passage 18 which is, in turn, connected to the delivery side of an air pump 31, driven by the engine, via an air supply conduit 30. A check valve 32 only allowing the inflow of air into the common connecting passage 18 from the air pump 31 is arranged in the air feed conduit 30.

Figure 9:
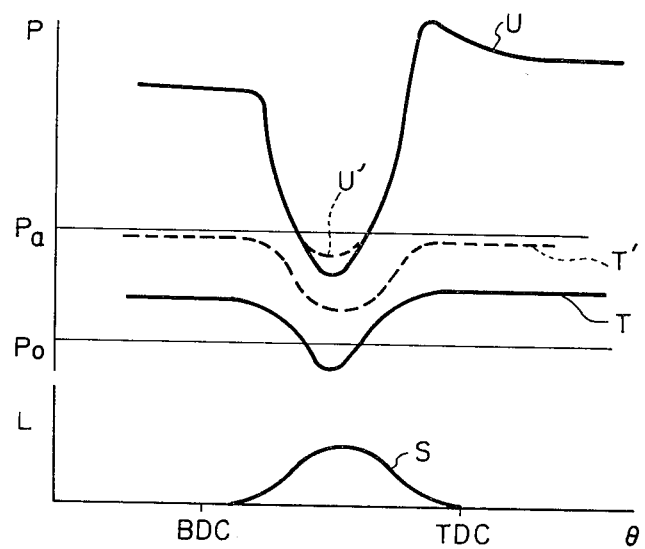
FIG. 9 is a graph showing changes in pressure in the accumulation chamber and in the combustion chamber.

FIG. 9 shows changes in pressure in the accumulation chamber and the combustion chamber. In FIG. 9, the ordinates P and L indicate pressure in the accumulation chamber and valve lift of the accumulation valve, respectively, and the abscissa θ indicates crank angle. In addition, in FIG. 9, the curved line S indicates the valve lift of the accumulation valve, and Po of the ordinate P indicates atmospheric pressure. Furthermore, in FIG. 9, the curved line T indicates the pressure in the accumulation chamber when the vacuum produced in the intake manifold (not shown) of the engine is equal to −420 mmHg, while the curved line U indicates the vacuum in the accumulation chamber when the vacuum produced in the intake manifold is equal to −60 mmHg. From FIG. 9, it will be understood that the pressure in the accumulation chamber greatly varies in accordance with changes in the level of the vacuum produced in the intake manifold, that is, in accordance with changes in level of the load of the engine, and that the pressure in the accumulation chamber is increased as the level of vacuum produced in the intake manifold is reduced. Assuming that the check valve 32 illustrated in FIG. 8 is so constructed that the pressure causing the check valve 32 to open is set at 1.5 (kg/cm$^2$), as shown by Pa in FIG. 9, in the case wherein the vacuum produced in the intake manifold is equal to −420 mmHg, as shown by the curved line T, the air is always fed into the common connecting passage 18 from the air pump 31 via the check valve 32. As a result of this, in this case, the pressure in the accumulation chamber is increased as shown by the broken curved line T', as compared with the case wherein the feeding operation of air is not carried out. On the other hand, in the case wherein the vacuum produced in the intake manifold is equal to −60 mmHg, the air is fed into the accumulation chambers 14a, 14b, 14c, 14d from the air pump 31 when the pressure in the accumulation chambers 14a, 14b, 14c, 14d is reduced below the above-mentioned set pressure Pa. Consequently, in this case, the pressure in the accumulation chambers 14a, 14b, 14c, 14d varies as shown by the broken curved line U' in FIG. 9.

As is mentioned above, particularly in the case wherein the engine is operating under a light load, the pressure in the accumulation chambers 14a, 14b, 14c, 14d is increased due to the air feeding operation. As a result of this, the energy of the combustible mixture spouted from each of the accumulation chambers 14a, 14b, 14c, 14d into the corresponding combustion chamber is increased, and thus it is possible to create a strong swirl motion in the combustion chamber. In addition, in the case wherein the spark plug 9 (FIG. 2) is so arranged that its electrode is directly exposed to the combustible mixture spouted from the accumulation chambers 14a, 14b, 14c, 14d, there is an advantage that the ignition can be improved because the electrode of the spark plug 9 is scavenged by the combustible mixture spouted from the accumulation chambers 14a, 14b, 14c, 14d. Furthermore, by increasing the above-mentioned set pressure Pa of the check valve 32, it is possible to increase the energy of the combustible mixture spouted from the accumulation chamber over a wider range of load conditions of an engine, and also it is possible to create a strong swirl motion in the combustion chamber when an engine is operating under a condition wherein the amount of air fed into the combustion chamber via the intake valve is small.

Figure 10:
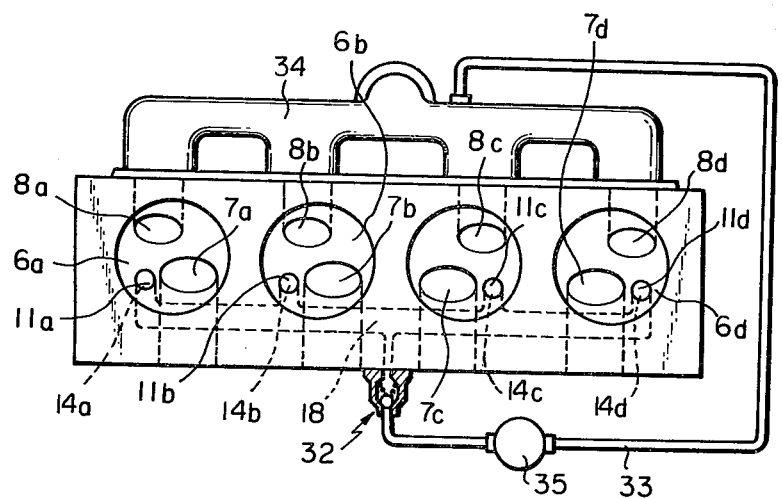
FIG. 10 is a bottom view of the cylinder head of a still further embodiment according to the present invention.

FIG. 10 illustrates a still further embodiment. In this embodiment, the common connecting passage 18 is connected to an exhaust manifold 34 via the check valve 32 and a recirculated exhaust gas feed conduit 33. As is illustrated in FIG. 10, a recirculated exhaust gas flow control valve 35 may be arranged in the recirculated exhaust gas feed conduit 33 for controlling the amount of the exhaust gas recirculated into the common connecting passage 18 from the exhaust manifold 34. In this embodiment, there is an advantage that the recirculated exhaust gas is uniformly distributed into each of the combustion chambers 6a, 6b, 6c, 6d.

Figure 11:
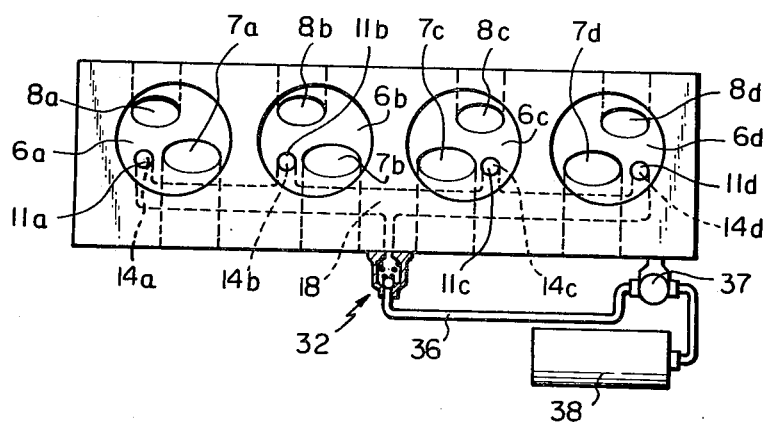
FIG. 11 is a bottom view of the cylinder head of a still further embodiment according to the present invention.

FIG. 11 illustrates a still further embodiment. Referring to FIG. 11, the common connecting passage 18 is connected to a water tank 38 via the check valve 32, a water feed conduit 36 and a water pump 37 driven by the engine. In this embodiment, water fed into the common connecting passage 18 is uniformly distributed into each of the combustion chambers 6a, 6b, 6c, 6d and, as a result, it is possible to suppress the production of harmful $NO_x$ components in the combustion chamber.

The present invention is hereinbefore described with reference to a spark-ignition type engine. However, it should be apparent that the present invention can be applied to a compression-ignition type engine.

According to the present invention, since at least one pair of the accumulation chambers and the common connecting passage are used as an accumulation chamber for each cylinder, the volume of the accumulation chamber is increased as compared with the case wherein the single accumulation chamber is provided independently for each cylinder. As a result of this, the energy of the combustible mixture spouted out from the accumulation chamber into the combustion chamber is increased, and thus a strong turbulence can be caused in the combustion chamber. Therefore, it is possible to considerably increase the burning velocity. In addition, since the combustible mixture is accumulated in the accumulation chamber for a short time, it is possible to suppress the pressure drop in the accumulation chamber and, as a result, the pressure in the accumulation chamber can be maintained high. Furthermore, since the combustible mixture is uniformly spouted from the accumulation chamber in all of the cylinders, torque fluctuation can be prevented. In addition, by feeding air into the common connecting passage, a strong turbulence can be caused in the combustion chamber, even when an engine is operating under a light load. Furthermore, by recirculating the exhaust gas into the common connecting passage or by feeding water into the common connecting passage, it is possible to uniformly suppress the production of harmful $NO_x$ components in all of the cylinders.

While the invention has been described by reference to specific embodiments chosen for purposes of illustration, it should be apparent that numerous modifications could be made thereto by those skilled in the art without departing from the spirit and scope of the invention.

What is claimed is:

1. A multi-cylinder internal combustion engine having a cylinder block, a cylinder head, a plurality of cylinders each comprising a cylinder bore formed in said cylinder block, a piston movable in each cylinder bore, a combustion chamber formed between each piston and said cylinder head, an accumulation chamber for each cylinder formed in said cylinder head and having a port connected to the corresponding combustion chamber, an intake passage with an intake valve for leading a suction gas into each combustion chamber, an exhaust passage with an exhaust valve for discharging exhaust gas from each cylinder into the atmosphere, and valve means for opening said port of each accumulation chamber during the compression stroke of the corresponding piston to permit the inflow of the suction gas into said accumulation chamber from said combustion chamber during the latter half of each compression stroke for temporarily accumulating the suction gas under pressure after said valve means closes said port of said accumulation chamber and to spout a jet of accumulated suction gas, under a pressure close to the pressure in the combustion chamber just before said port was previously closed, from said accumulation chamber into said combustion chamber during the first half of each compression stroke, wherein the improvement comprises at least one connecting passage interconnecting at least two of said accumulation chambers to each other, such that the suction gas accumulated during the latter half of the compression stroke in the cylinder corresponding to one of said at least two accumulation chambers is spouted out during the first half of the next compression stroke occurring in a cylinder corresponding to another of said at least two accumulation chambers, thereby shortening the average storage time of said accumulated suction gas and correspondingly reducing its loss of pressure due to cooling in the accumulation chamber.

2. A multi-cylinder internal combustion engine as claimed in claim 1, further comprising means for connecting said port of each accumulation chamber to the corresponding combustion chamber so that said jet is directed in substantially a circumferential direction relative to the wall of said combustion chamber.

3. A multi-cylinder internal combustion engine as claimed in claim 2, wherein said means for connecting each port to its corresponding combustion chamber comprises a hollow cylindrical cap member fixed onto said cylinder head, the inside thereof being connectable to said accumulation chamber via said valve means, said hollow cylindrical cap member having an opening which opens into said combustion chamber in a direction having a substantial circumferential component relative to the wall of said combustion chamber.

4. A multi-cylinder internal combustion engine as claimed in claim 2, wherein each combustion chamber comprises a spark plug arranged on the periphery of said cylinder head to be exposed to the stream of the suction gas spouted from said port of said accumulation chamber.

5. A multi-cylinder internal combustion engine as claimed in claim 1, wherein each combustion chamber comprises a main combustion chamber, an auxiliary combustion chamber connectable to said accumulation chamber via said valve means, a flame jet injecting hole interconnecting said main combustion chamber to said auxiliary combustion chamber, and a spark plug for igniting the suction gas within said auxiliary combustion chamber.

6. A multi-cylinder internal combustion engine as claimed in claim 5, wherein said spark plug is arranged in said flame jet injecting hole.

7. A multi-cylinder internal combustion engine as claimed in claim 1, wherein said connecting passage is formed in said cylinder head and connected only to at least two accumulation chambers.

8. A multi-cylinder internal combustion engine as claimed in claim 1, wherein said connecting passage is connected to a fluid source for feeding the fluid into said connecting passage from said fluid source.

9. A multi-cylinder internal combustion engine as claimed in claim 8, wherein said fluid source comprises an air pump driven by said engine for feeding the air into said connecting passage.

10. A multi-cylinder internal combustion engine as claimed in claim 8, wherein said fluid source comprises said exhaust passage for recirculating exhaust gas into said connecting passage.

11. A multi-cylinder internal combustion engine as claimed in claim 8, wherein said fluid source comprises a a water tank for feeding water into said connecting passage.

12. A multi-cylinder internal combustion engine as claimed in claim 8, wherein a check valve is arranged between said connecting passage and said fluid source for allowing the inflow of the fluid into said connecting passage from said fluid source when the pressure in said connecting passage is reduced below a predetermined level.

13. A multi-cylinder internal combustion engine as claimed in claim 1, wherein the closing timing of said valve means is set at a timing near the ignition timing.

* * * * *